R. A. DRAWDY.
BRICK MACHINE.
No. 181,058.                                    Patented Aug. 15, 1876.
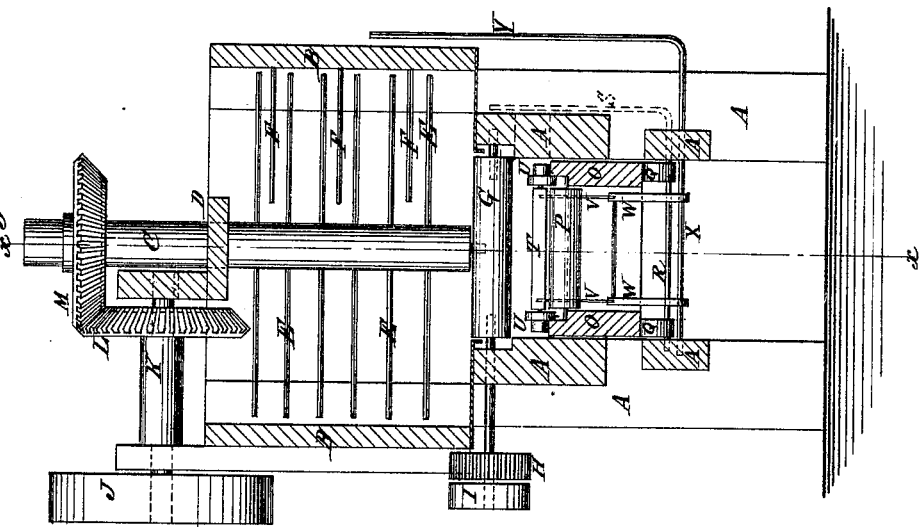
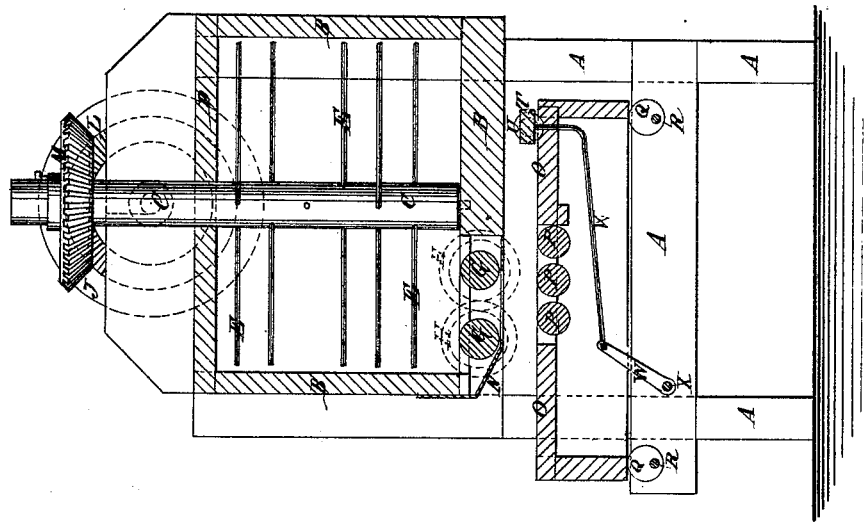
WITNESSES:                                      INVENTOR:
H. Rydquist.                                    R. A. Drawdy
John Goethals                                   BY
                                                ATTORNEYS.

UNITED STATES PATENT OFFICE.

RICHARD A. DRAWDY, OF JACKSONVILLE, FLORIDA.

IMPROVEMENT IN BRICK-MACHINES.

Specification forming part of Letters Patent No. 181,058, dated August 15, 1876; application filed June 26, 1876.

*To all whom it may concern:*

Be it known that I, RICHARD A. DRAWDY, of Jacksonville, in the county of Duval and State of Florida, have invented a new and useful Improvement in Brick-Machine, of which the following is a specification:

Figure 1 is a vertical longitudinal section of my improved machine, taken through the line $x\ x$, Fig. 2. Fig. 2 is a vertical cross-section of the same.

Similar letters of reference indicate corresponding parts.

The object of this invention is to furnish an improved brick-machine, which shall be so constructed as to force out the clay into the molds with a continuous pressure, so that there can be no imperfectly-filled molds, as there will be when the bricks are molded with an intermittent pressure.

The invention consists in the two parallel rollers geared to each other, revolving toward each other, placed in an opening in the bottom of the mud-box of a brick-machine, and driven from the shaft of said mud-box by suitable connecting-gearing; in the combination of the platform, and its rollers with the frame, the mud-box, and the rollers of a brick-machine.

A represents the frame of the lower part of the machine, to the top of which is secured the mud-box B. In the center of the bottom of the mud-box B is pivoted the lower end of an upright shaft, C, the upper part of which revolves in a cross-bar, D, attached to the top of the mud-box B. To the shaft C are attached numerous radial arms, E, which, as the said shaft C revolves, pass between a number of stationary arms, F, attached to the side of the mud-box B, so as to keep the mud well worked, and feed it down toward the bottom of said mud-box. A part of the bottom of the mud-box B is cut away, and in the space thus formed are placed two parallel rollers, G, placed about four inches apart. To the journals of the rollers G are attached two gear-wheels, H, the teeth of which mesh into each other, so that the rollers may be revolved at the same time and toward each other to press the mud out between them. The horizontal rollers G should be geared about eight and three-fourths inches apart, and said rollers should have small tacks driven into them, and projecting about one-eighth of an inch, presenting a very rough surface, so that the clay may adhere better. To the journal of one of the rollers G is attached a small pulley, I, around which passes a belt, which also passes around a large pulley, J, attached to the outer end of a horizontal shaft, K. The shaft K revolves in bearings in bars attached to the mud-box B, and to its inner end is attached a bevel-gear wheel, L, the teeth of which mesh into the teeth of a bevel-gear wheel, M, attached to the shaft C, so that the rollers G may be driven from the said shaft C. The shaft C may be driven by horse-power, by steam, or by other convenient power. To the mud-box B, beneath the rollers G, is attached a metal plate, N, the middle part of which is cut away, so that its inner edges may be beneath the centers of the rollers G, to separate the clay from said rollers, and cause it to pass into the molds. The molds, while being filled, stand upon the cast-iron plate or platform O, or upon rollers P, pivoted in said platform, so as to form a part of its top. The platform O rests upon four eccentrics, Q, attached to two rods, R, which are pivoted to the frame A, and to the ends of which are attached two levers, S, so that the said platform O may be raised and lowered by operating the said levers S, to adjust it to the depth of the molds to be used. While each mold is being filled an empty mold is placed behind it upon the rear part of the platform O. As each mold is filled it is pushed out by pressing the empty mold forward by the cross-bar T, which is then drawn back to allow another empty mold to be inserted before it. The molds are inserted through an opening in the side of the frame A. The cross-bar T moves forward and back upon small wheels U, pivoted to its ends, and which roll upon the said platform O. To the end parts of the cross-bar T are attached the ends of two rods, V, which pass downward, are bent forward, and their other ends are pivoted to the ends of two arms, W, rigidly attached to the shaft X, which works in bearings in the frame A, and to its end is attached a lever, Y, so that the filled molds may be pushed out by operating the said lever Y.

Having thus described my invention, I claim as new and desire to secure by Letters Patent—

1. The two parallel rollers G, geared to each other, revolving toward each other, placed in an opening in the bottom of the mud-box B of a brick-machine, and driven from the shaft C of said mud-box by suitable connecting-gearing, substantially as herein shown and described.

2. The combination of the platform O and rollers P with the frame A, the mud-box B, and the rollers G, substantially as herein shown and described.

RICHARD ALEN DRAWDY.

Witnesses:
   W. A. McLEAN,
   C. M. COOPER.